United States Patent
Sasaki

(10) Patent No.: US 12,244,777 B2
(45) Date of Patent: Mar. 4, 2025

(54) RECORDING DEVICE TO READ AN IMAGE OF A DOCUMENT AND DETERMINE THE POSITION OF AN EDGE GUIDE TO DETECT THE SIZE OF A MEDIUM WITH THE SAME READER USED TO DETECT THE DOCUMENT IMAGE

(71) Applicant: SEIKO EPSON CORPORATION, Tokyo (JP)

(72) Inventor: Keisuke Sasaki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/462,658

(22) Filed: Sep. 7, 2023

(65) Prior Publication Data
US 2024/0089386 A1    Mar. 14, 2024

(30) Foreign Application Priority Data
Sep. 9, 2022 (JP) ................. 2022-143531

(51) Int. Cl.
  *H04N 1/00*   (2006.01)
  *H04N 1/04*   (2006.01)
(52) U.S. Cl.
  CPC ..... *H04N 1/00737* (2013.01); *H04N 1/00702* (2013.01); *H04N 1/00708* (2013.01); *H04N 1/00761* (2013.01)

(58) Field of Classification Search
  CPC .......... H04N 1/00702; H04N 1/00708; H04N 1/0071; H04N 1/00737; H04N 1/00761; H04N 1/00748; H04N 1/123
  USPC ....................... 358/1.11–1.18, 488
  See application file for complete search history.

(56) References Cited

U.S. PATENT DOCUMENTS 6,075,623 A * 6/2000 Yun ................. H04N 1/00708
                                                    358/488
2017/0257503 A1   9/2017 Tsukada
2021/0258440 A1 * 8/2021 Yoshikaie .......... H04N 1/00774

FOREIGN PATENT DOCUMENTS

JP    2007008704 A  * 1/2007
JP    2017154889 A    9/2017

* cited by examiner

*Primary Examiner* — Chad Dickerson
(74) *Attorney, Agent, or Firm* — CHIP LAW GROUP

(57) ABSTRACT

A recording device includes a reading device including a reading unit that reads an image of a document, a placement unit at which a medium is placed, and a recording unit that performs recording on the medium transported from the placement unit. A size of the medium is determined by emitting light from the reading unit toward a detection target and calculating a position thereof, the position of the detection target changing in accordance with the size of the medium placed at the placement unit.

10 Claims, 12 Drawing Sheets

| | | WIDTH DIMENSION OF MEDIUM M | SEEK DISTANCE B | DISCRIMINANT FORMULA |
|---|---|---|---|---|
| TYPE OF MEDIUM M | LETTER | 215.9 | -2.95 | $-3.95 \leq B \leq -1.95$ |
| | A4 | 210 | 0 | $-1 \leq B \leq 1$ |
| | 2L | 127 | 41.5 | $40.5 \leq B \leq 42.5$ |
| | KG | 102 | 54 | $53 \leq B \leq 55$ |
| | L SIZE | 89 | 60.5 | $59.5 \leq B \leq 61.5$ |
| | BUSINESS CARD | 55 | 77.5 | $76.5 \leq B \leq 78.5$ |

UNIT: mm

FIG. 12

RECORDING DEVICE TO READ AN IMAGE OF A DOCUMENT AND DETERMINE THE POSITION OF AN EDGE GUIDE TO DETECT THE SIZE OF A MEDIUM WITH THE SAME READER USED TO DETECT THE DOCUMENT IMAGE

The present application is based on, and claims priority from JP Application Serial Number 2022-143531, filed Sep. 9, 2022, the disclosure of which is hereby incorporated by reference herein in its entirety.

BACKGROUND

1. Technical Field

The present disclosure relates to a recording device.

2. Related Art

JP-A-2017-154889 discloses a printing device that performs printing by ejecting ink from a printing head onto a printing paper, which is an example of a medium. The printing head is an example of a recording unit, and the printing device is an example of a recording device. It is also disclosed that the printing device is provided with a plurality of sensors for determining the size of the printing paper.

However, the printing device disclosed in JP-A-2017-154889 requires the plurality of sensors for determining the size of the printing paper, and there is a risk that this may lead to an increase in the cost of the printing device.

SUMMARY

A recording device includes a reading device including a reading unit configured to read an image of a document, a placement unit at which a medium is placed, and a recording unit configured to perform recording on the medium transported from the placement unit. A size of the medium is determined by emitting light from the reading unit toward a detection target and calculating a position thereof, the position of the detection target changing in accordance with the size of the medium placed at the placement unit.

BRIEF DESCRIPTION OF THE DRAWINGS

FIG. 12 is a view illustrating width dimensions of a medium M, seek distances, and discrimant formulas, each corresponding to a type of the medium M.

DESCRIPTION OF EMBODIMENTS

Figure 1:
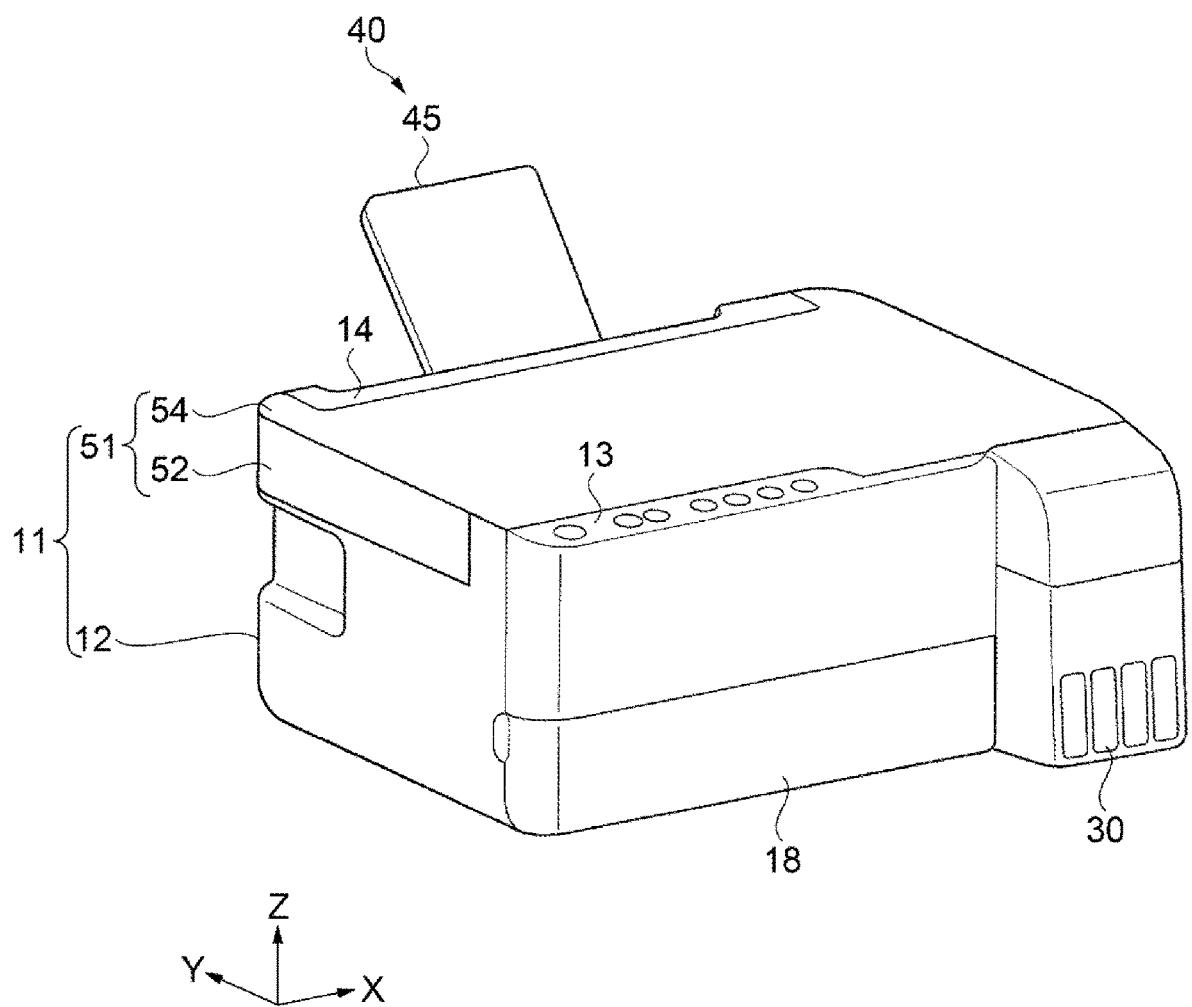
FIG. 1 is a perspective view of a recording device according to a first embodiment.

Hereinafter, the present disclosure will be described based on embodiments. The recording device is, for example, an ink-jet type printer configured to perform printing, by ejecting ink, which is an example of a liquid, onto paper that is an example of a medium M.

In the drawings, the same members are denoted by the same reference numerals, and repeated descriptions will be omitted. Note that, in the present specification, "the same", "identical", and "simultaneously" refer to being exactly the same, and also include a case of being the same in consideration of measurement errors, a case of being the same in consideration of manufacturing variations of members, and a case of being the same within a range that does not impair functions. Thus, for example, "both dimensions are the same" means that a dimensional difference between the two dimensions is within ±10%, more preferably within ±5%, and particularly preferably within ±3% of one dimension in consideration of measurement errors and manufacturing variations of members.

In addition, X, Y, and Z in each of the drawings represent three spatial axes orthogonal to each other. In the specification, directions along the axes are referred to as an X-axis direction, a Y-axis direction, and a Z-axis direction. In a case in which the direction is identified, a positive direction is defined as "+", a negative direction is defined as "−", both positive and negative signs are used for direction notation, and a direction in which an arrow points in each of the drawings is described as a +direction, and a direction opposite to the arrow is described as a −direction.

Further, the Z-axis direction indicates a direction of gravity, the +Z direction indicates a vertical upward direction, and the −Z direction indicates a vertical downward direction. Therefore, the Z-axis direction may also be referred to as a vertical direction. A plane including the X axis and the Y axis is described as an X-Z plane, a plane including the X axis and the Z axis is described as an X-Z plane, and a plane including the Y axis and the Z axis is described as a Y-Z plane. Also, the X-Y plane is a horizontal plane. Furthermore, the three spatial axes of X, Y, and Z that are not limited to positive and negative directions will be described as the X axis, Y axis, and Z axis.

Figure 7:
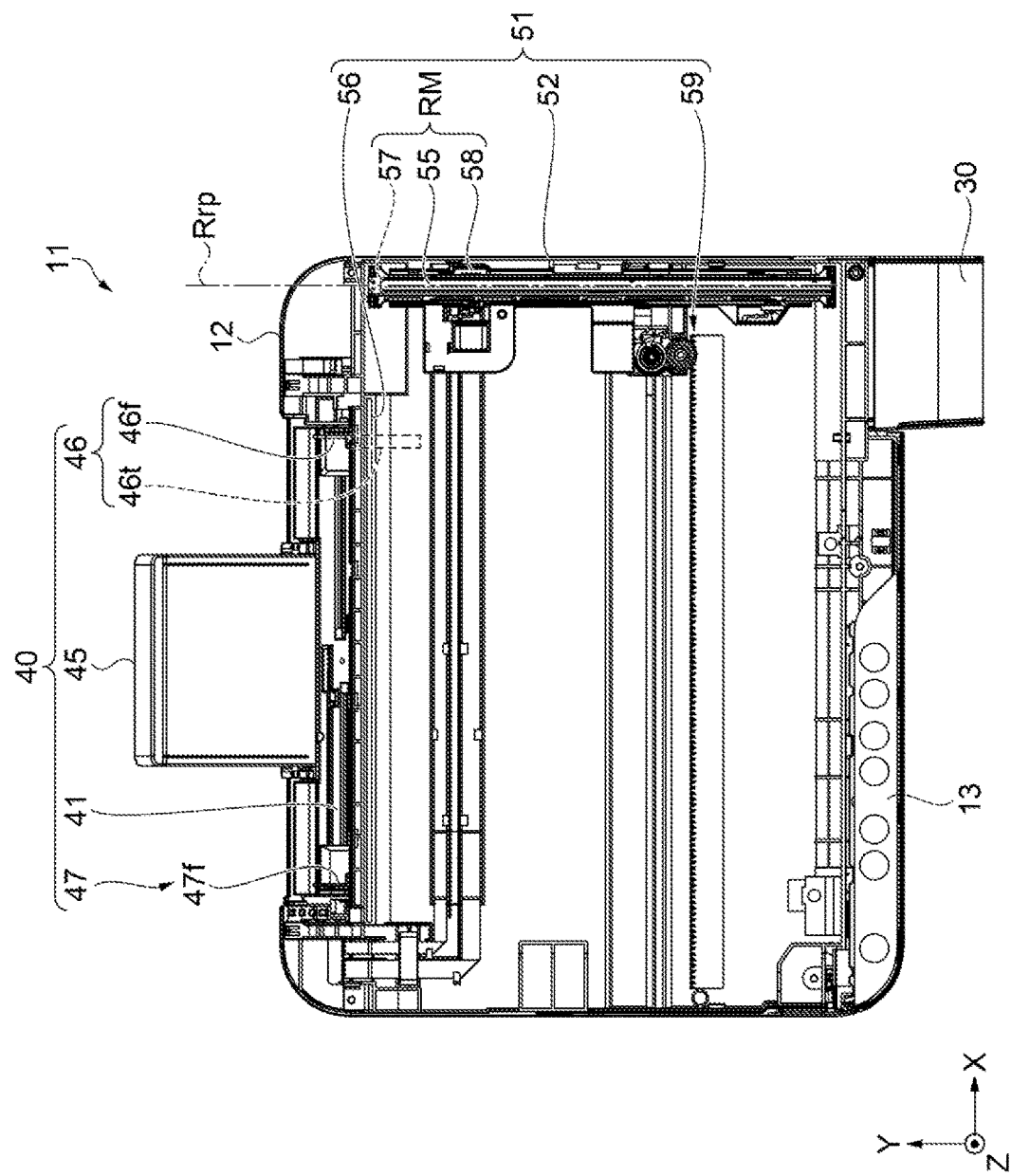
FIG. 7 is a schematic view of the recording device according to the first embodiment, in which the reading unit is at a home position.
Figure 8:
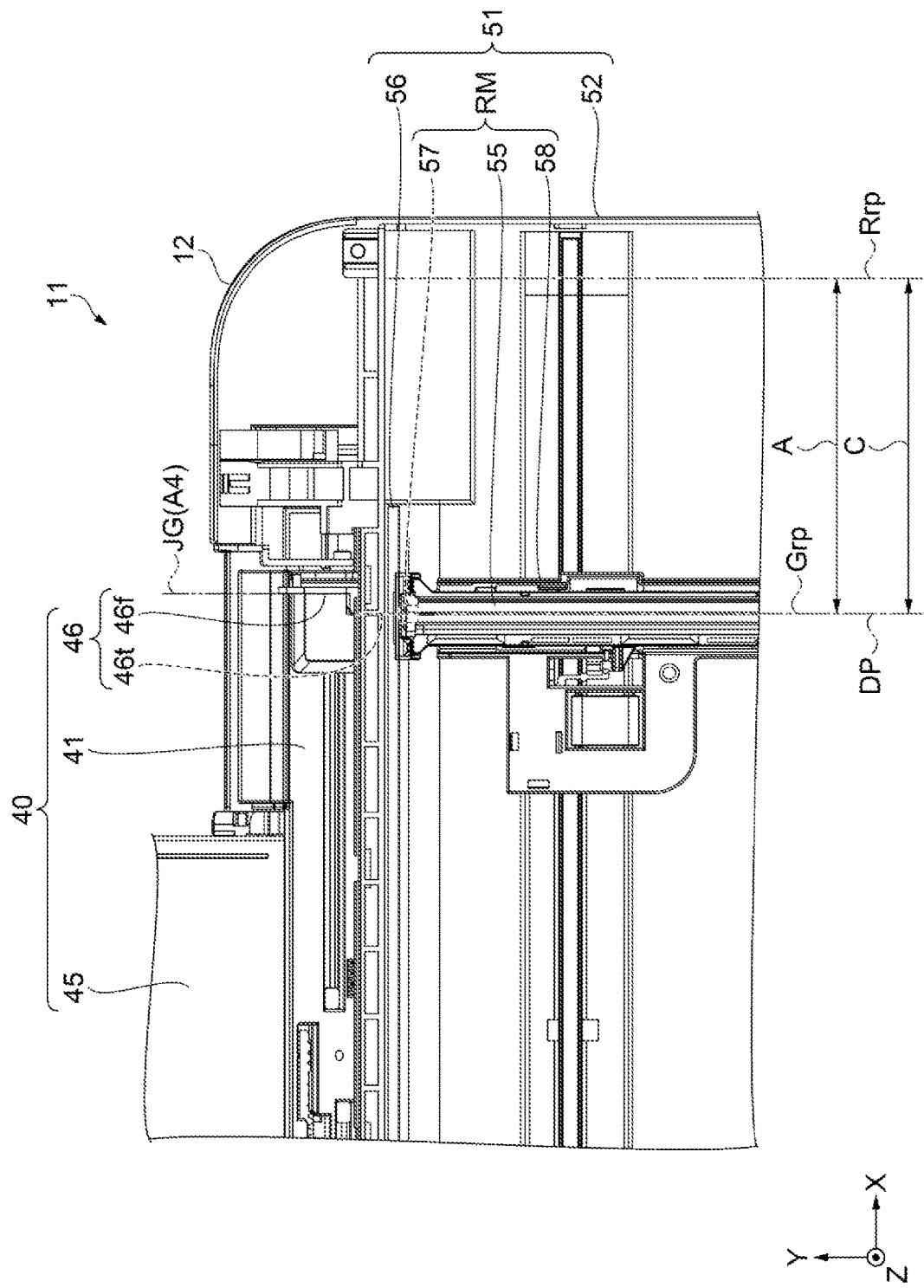
FIG. 8 is a schematic view of main components of the recording device according to the first embodiment, in which the reading unit is at a detection position.
Figure 9:
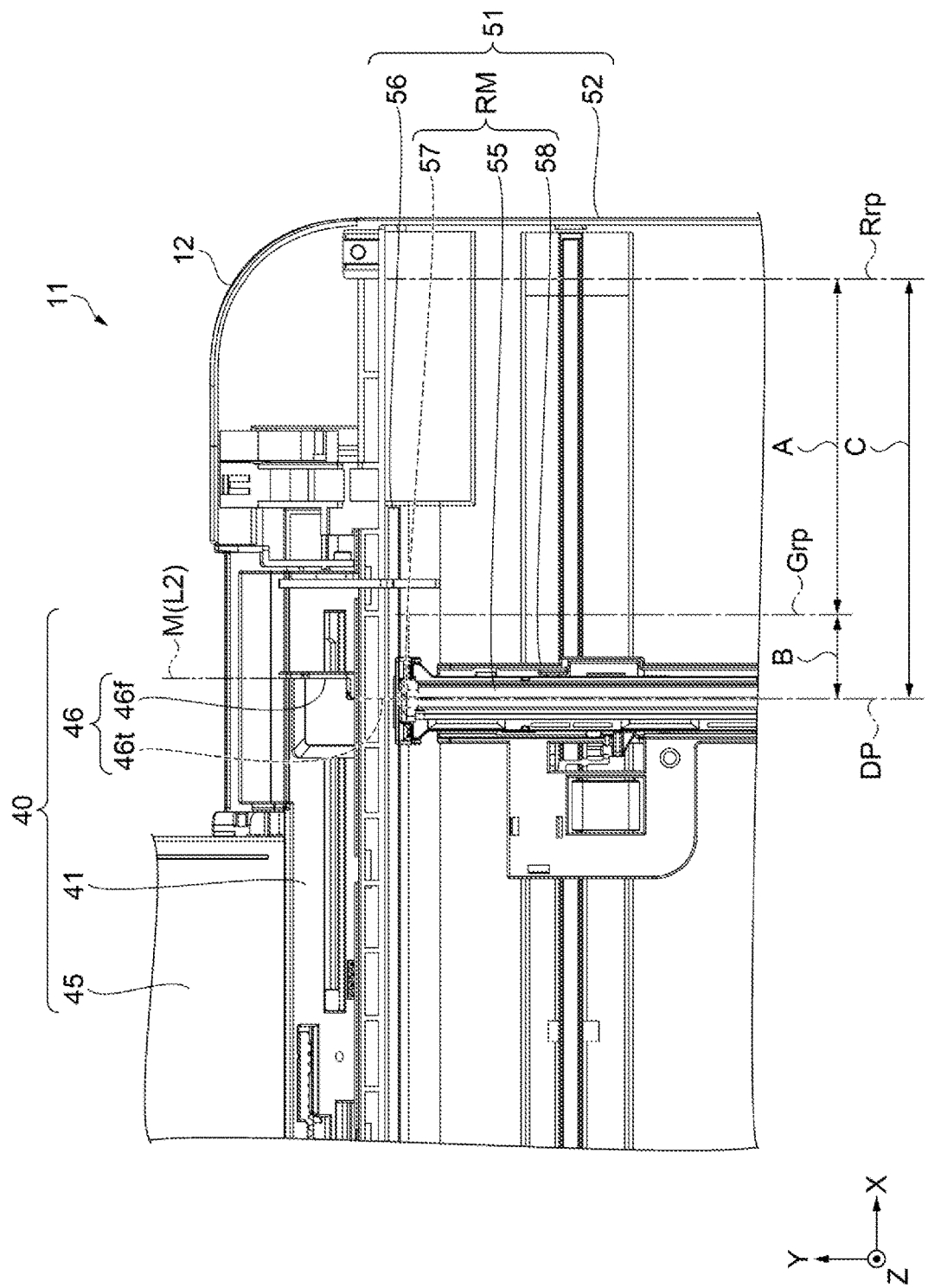
FIG. 9 is a schematic view of main components of the recording device according to the first embodiment, in which the reading unit is at the detection position.

In each of the drawings, the X-axis direction is a width direction of a recording device 11, and is a width direction of the medium M. In each of the drawings, the Y-axis direction is the depth direction of the recording device 11. The +Y direction is a direction from the front surface of the recording device 11 toward the rear surface of the recording device 11. The −Y direction is a direction from the rear surface of the recording device 11 toward the front surface of the recording device 11. Note that the front surface of the recording device 11 is a surface on which a front door 18 is disposed. For the purpose of description, FIG. 7 to FIG. 9 illustrate the recording device 11 in a state in which the +Z direction side of a case 52 in a reading device 51, and a document table 53 are omitted.

1. First Embodiment

As illustrated in FIG. 1, the recording device 11 is provided with a main body 12 and the reading device 51 attached to the +Z direction side of the main body 12. The main body 12 is an example of a device main body. The recording device 11 has a configuration in which the reading device 51 is stacked on the +Z direction side of the main body 12 in the Z-axis direction. An opening (see FIG. 2) through which the interior of the main body 12 can be accessed is provided at the upper side of the main body 12 in the +Z direction.

The reading device 51 is attached to the main body 12 so as to be rotatable between a closed position (see FIG. 1) at which the reading device 51 covers the upper side of the main body 12, and an open position (not illustrated) at which the reading device 51 exposes the opening of the main body 12. Further, the recording device 11 is provided with an operation unit 13, on the −Y direction side of the reading device 51. The operation unit 13 includes buttons that are operated when imparting commands to the recording device 11.

Further, as illustrated in FIG. 1 to FIG. 4, in the main body 12, the recording device 11 is provided with a placement unit 40, a transport unit 15, a recording unit 20, a carriage moving mechanism 26, a liquid container 30, the front door 18, a discharge unit 19, and a control unit 90.

Figure 2:
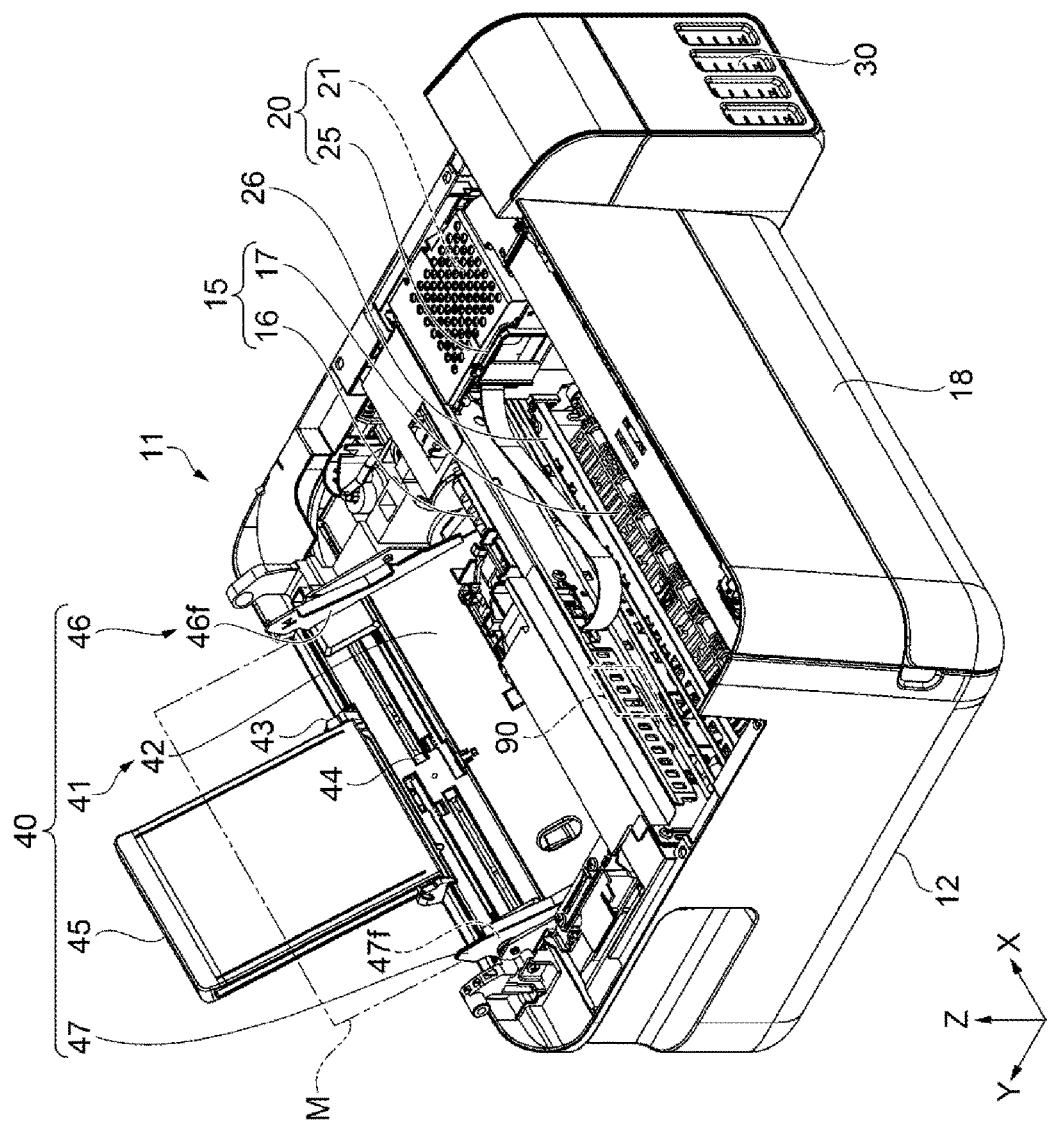
FIG. 2 is a perspective view of the recording device according to the first embodiment, in a state in which a reading device is omitted.
Figure 3:
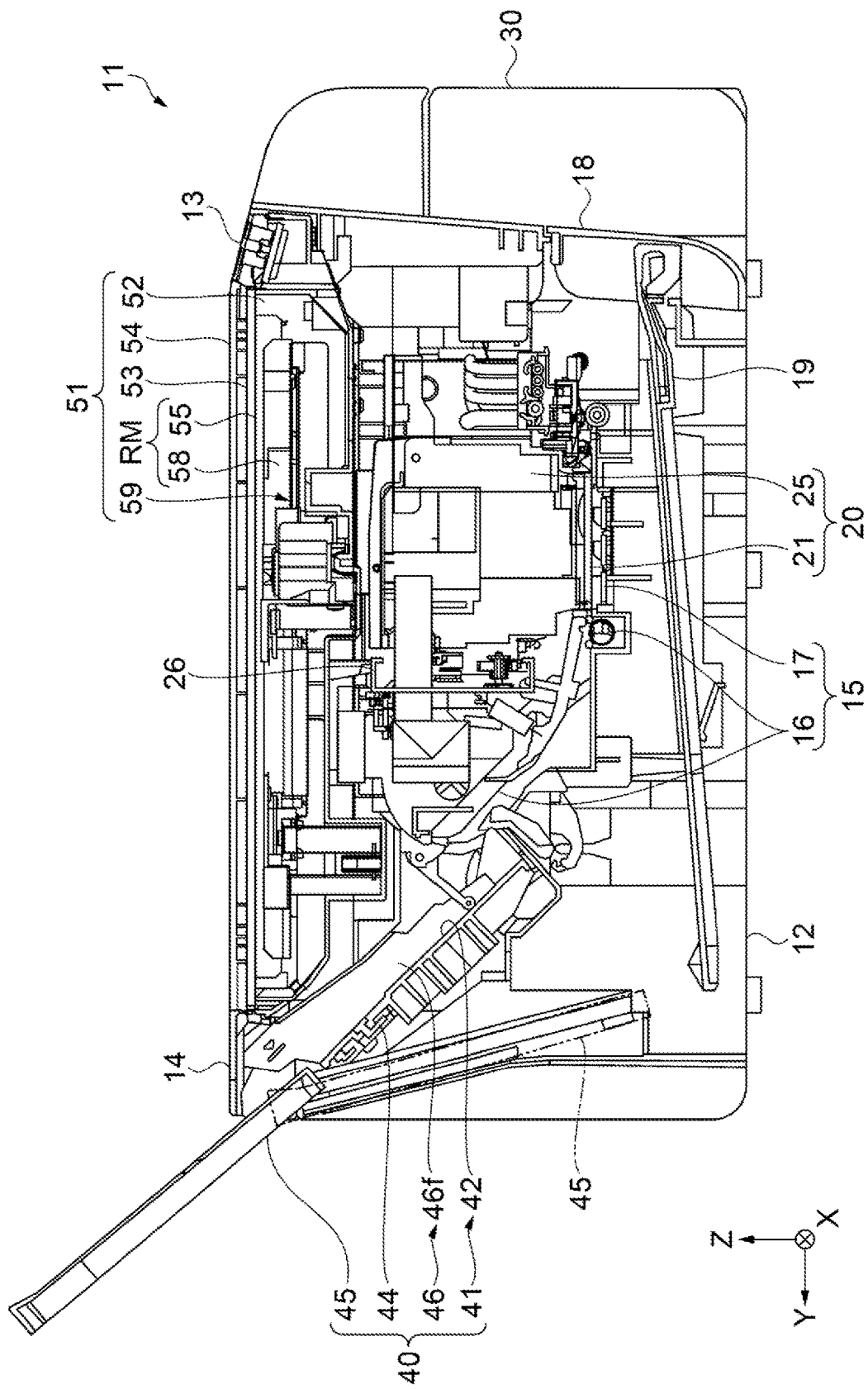
FIG. 3 is a cross-sectional view of the recording device according to the first embodiment.

The medium M is placed at the placement unit 40. As illustrated in FIG. 2 and FIG. 3, the placement unit 40 is disposed, in an inclined posture, at the rear surface side, which is the +Y direction side, of the main body 12. The placement unit 40 includes a placement base 41, a support plate 45, and edge guides 46 and 47.

The placement base 41 includes a placement surface 42 on which the medium M is placed, a support plate holding unit 43, and an edge guide moving mechanism 44. The support plate holding unit 43 is disposed at a +Z direction side end portion of the placement base 41. The support plate holding unit 43 holds the support plate 45 such that the support plate 45 is movable between a support position and a storage position.

As illustrated in FIG. 1 to FIG. 3, the support plate 45 at the support position extends obliquely upward along the placement surface 42 from the +Z direction side end portion of the placement base 41. Of the medium M placed at the placement surface 42 of the placement base 41, the support plate 45 at the support position supports a portion protruding from the placement surface 42 in the +Z direction. As indicated by a two-dot chain line in FIG. 3, the support plate 45 at the storage position is positioned inside the main body 12.

The edge guides 46 and 47 regulate the position, in the X-axis direction, of the medium M placed at the placement unit 40. As illustrated in FIG. 2, the edge guide 46 includes an edge guide surface 46f that regulates the movement of the medium M in the +X direction by coming into contact with the edge of the medium M in the +X direction. The edge guide 47 includes an edge guide surface 47f that regulates the movement of the medium M in the −X direction by coming into contact with the edge of the medium M in the −X direction.

Figure 6:
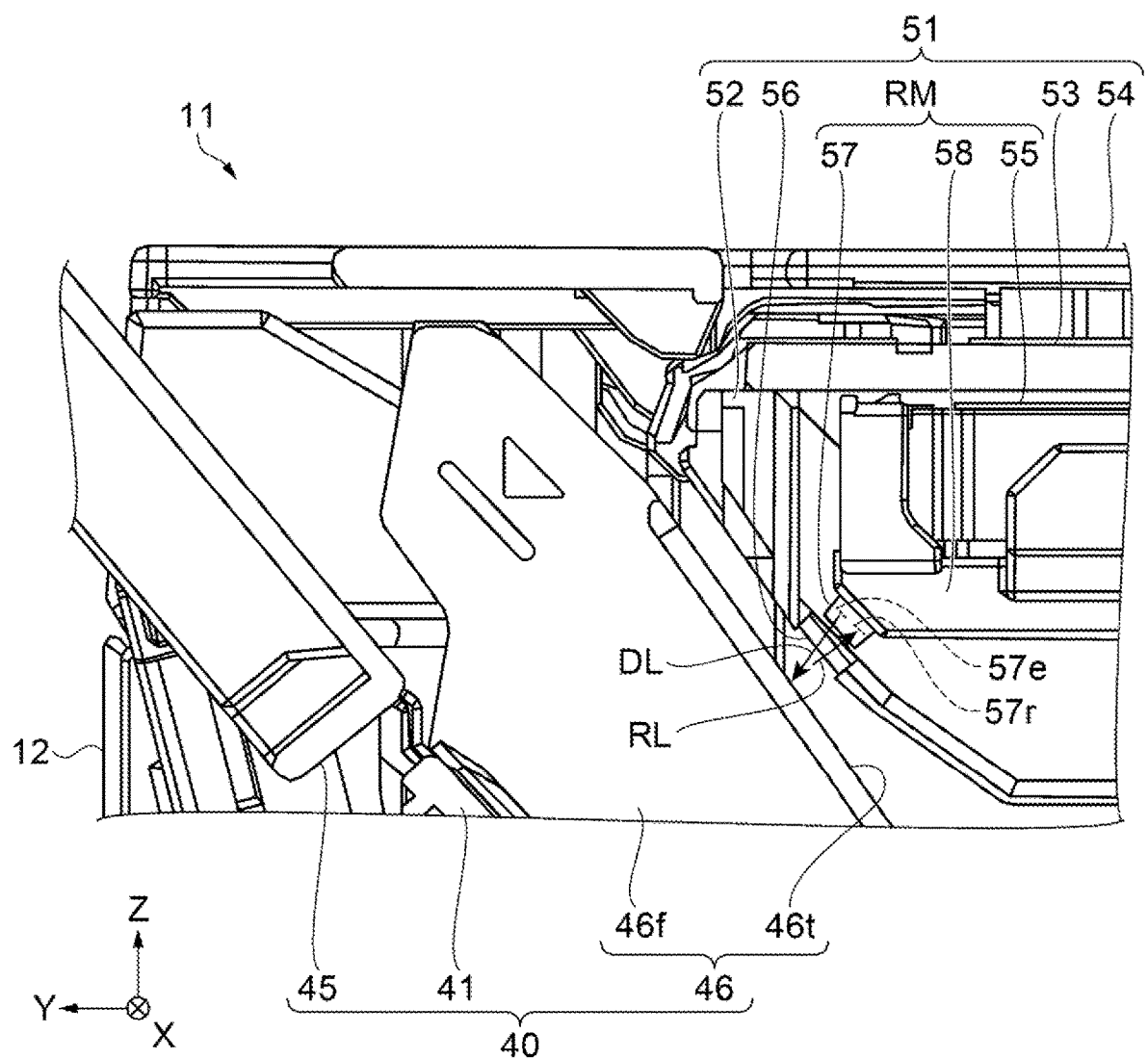
FIG. 6 is an enlarged schematic cross-sectional view of a periphery of the reading unit illustrated in FIG. 3.

Further, as illustrated in FIG. 6 and FIG. 7, the edge guide 46 includes a detection target portion 46t that reflects emission light DL emitted from a detection sensor 57 of a reading unit RM to be described below. The detection target portion 46t is disposed on an inclined surface of the edge guide 46. The inclined surface of the edge guide 46 is a surface facing a side wall on the +Y direction side of the case 52 included in the reading device 51 to be described below. In order to reflect the emission light DL, the surface of the detection target portion 46t is configured to be smoother than the placement surface 42 of the placement base 41, for example.

The edge guide moving mechanism 44 is configured to move the edge guides 46 and 47 in the X-axis direction. The edge guide moving mechanism 44 according to the embodiment regulates the position of the medium M so that the center of the medium M placed at the placement unit 40 is disposed, in the X-axis direction, at a reference position of the placement unit 40, by displacing the edge guides 46 and 47 in conjunction with each other. In the embodiment, the reference position of the placement unit 40 is the center of the placement surface 42 in the X-axis direction.

The edge guide moving mechanism 44 is provided with a rack, for example, in each of the edge guides 46 and 47 that are disposed on the placement base 41 so as to be movable in the X-axis direction. Further, in the edge guide moving mechanism 44, rotatable pinion gears are provided on the placement base 41 and mesh with the racks on each of the edge guides 46 and 47. In this way, the edge guides 46 and 47 move in opposite directions in the X-axis direction.

The edge guide moving mechanism 44 holds the edge guides 46 and 47 such that a distance between the edge guide surface 46f and the edge guide surface 47f can be changed in accordance with the width dimension of the medium M placed at the placement unit 40, which is the dimension of the medium M in the X-axis direction. For example, when a user moves the edge guides 46 and 47 in the X-axis direction, the edge guide surface 46f comes into contact with the edge of the medium M in the +X direction, and the edge guide surface 47f comes into contact with the edge of the medium M in the −X direction. In this way, in the X-axis direction, the position of the center of the medium M placed at the placement unit 40 is positioned at the center of the placement surface 42 regardless of the dimension of the medium M in the X-axis direction.

As illustrated in FIG. 2 and FIG. 3, the transport unit 15 includes a transport mechanism 16 and a medium support unit 17. The transport mechanism 16 transports the medium M placed at the placement unit 40 in the transport direction. The medium support unit 17 supports the medium M being transported by the transport mechanism 16. The medium support unit 17 is disposed downstream of the placement unit 40 in the transport direction.

The recording unit 20 performs recording on the medium M transported from the placement unit 40. The recording unit 20 includes a liquid ejecting head 21 and a carriage 25 that holds the liquid ejecting head 21. The liquid ejecting head 21 ejects ink, which is an example of a liquid supplied from the liquid container 30, from nozzles (not illustrated).

The carriage 25 is supported by the carriage moving mechanism 26 so as to be movable in the X-axis direction. When the carriage moving mechanism 26 is driven, the carriage 25 which holds the liquid ejecting head 21 moves in the X-axis direction, on the +Z direction side which is above the medium support unit 17. The recording unit 20 performs the recording on the medium M, by ejecting the ink from the nozzles of the liquid ejecting head 21 held by the carriage 25 toward the medium M being transported to the medium support unit 17.

The front door 18 is disposed on the front surface that is the surface on the −Y direction side of the main body 12. As illustrated in FIG. 1 to FIG. 4, the front door 18 is attached to the main body 12 so as to be rotatable between a closed position (see FIG. 1 to FIG. 3) at which the front door 18 covers the −Y direction side of the discharge unit 19 positioned at a stored position, and an open position (see FIG. 4) at which the front door 18 is positioned on the −Z direction side that is below the discharge portion 19 positioned at a receiving position.

Figure 4:
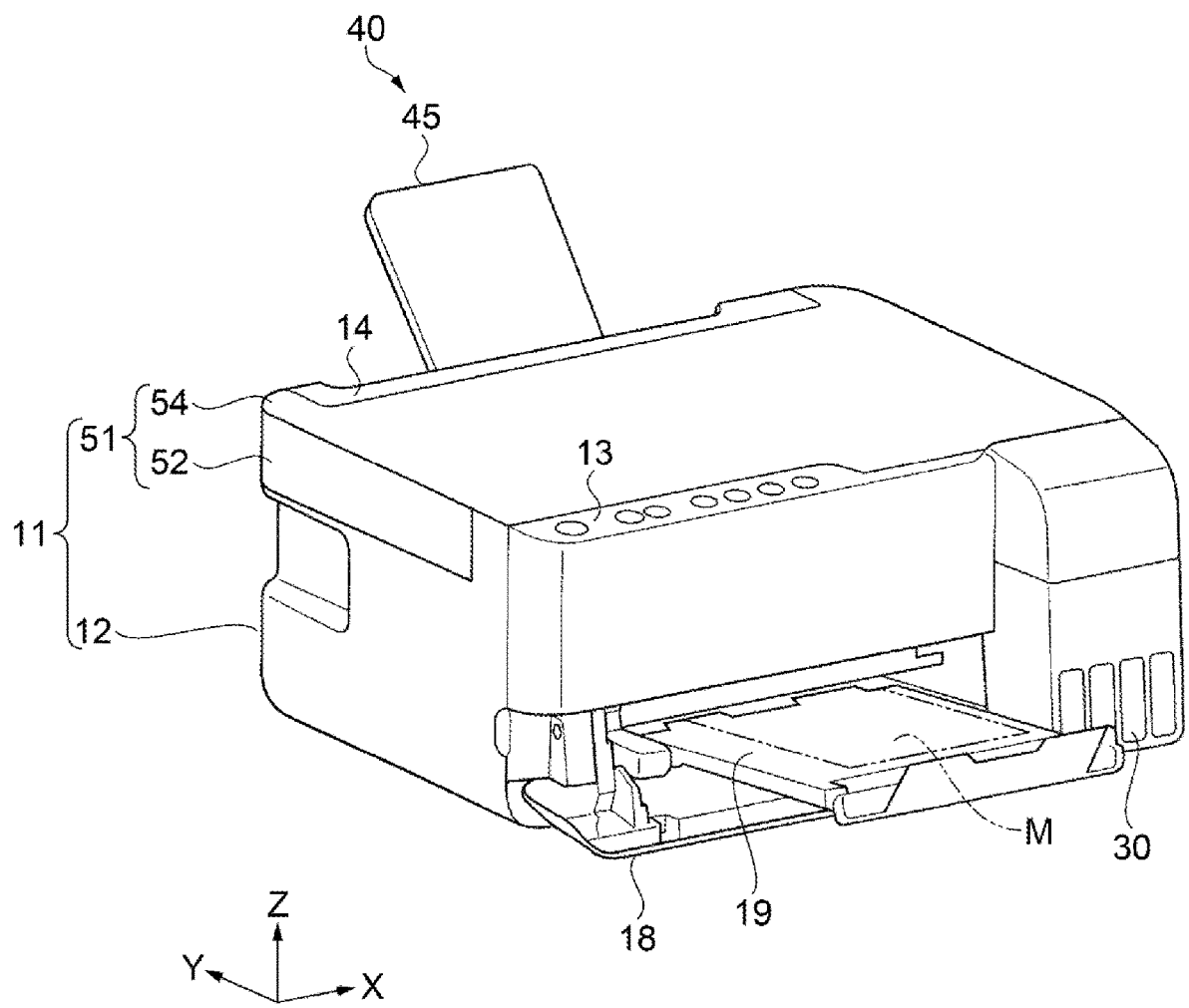
FIG. 4 is a perspective view of the recording device according to the first embodiment, in which a front door is at an open position.

As illustrated in FIG. 3, the stored position of the discharge unit 19 is provided at a position on the −Z direction side of the medium support unit 17 in the main body 12. As illustrated in FIG. 4, the discharge unit 19 at the receiving position is positioned downstream of the medium support unit 17 in the transport direction, and extends from the front surface of the main body 12 to the −Y direction side. The discharge unit 19 at the receiving position receives the medium M on which recording has been performed by the recording unit 20 and which has been transported by the transport mechanism 16.

Figure 5:
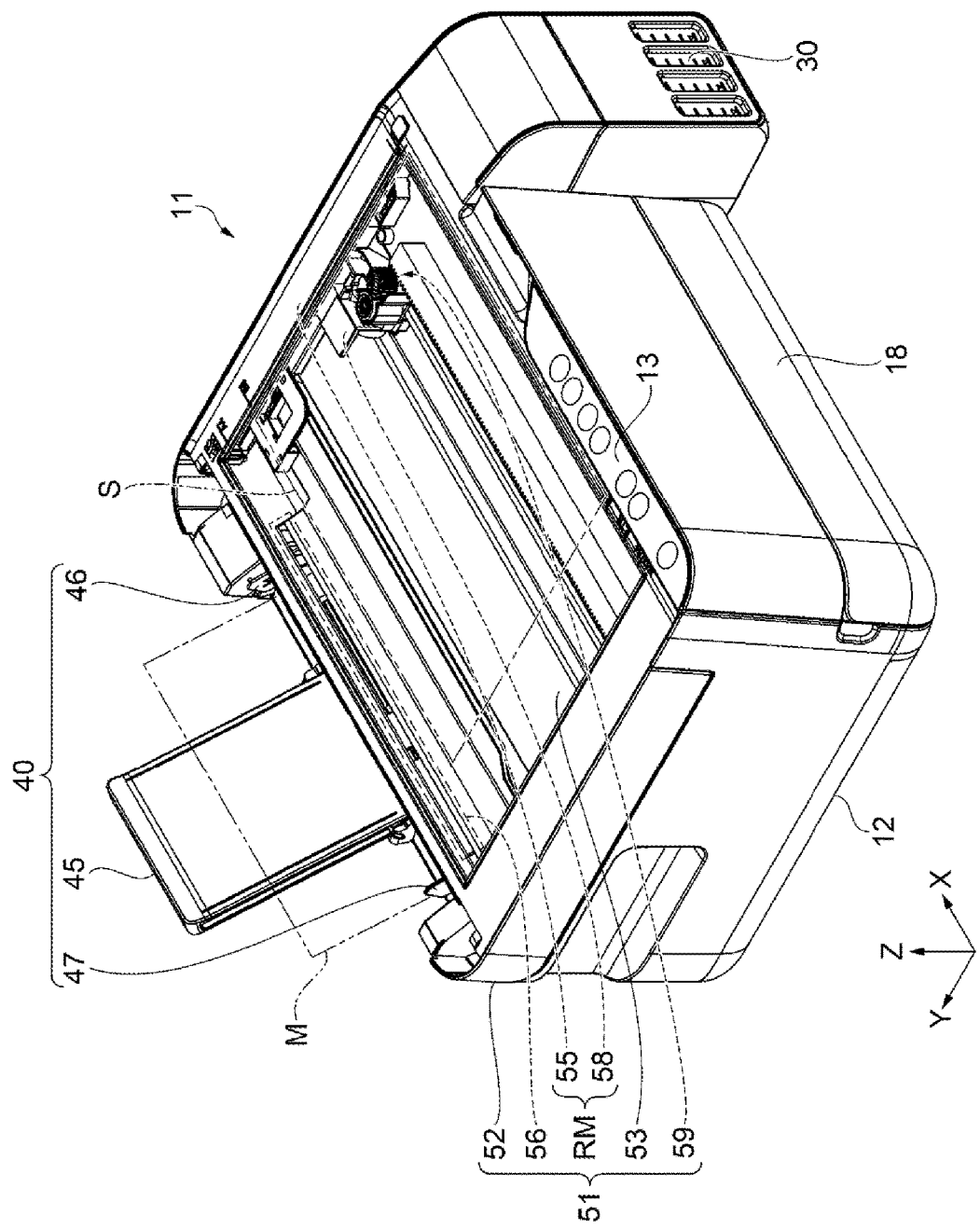
FIG. 5 is a perspective view of the recording device according to the first embodiment, in a state in which a document table cover is omitted.

The reading device 51 is configured to be able to read an image P, such as a character or a photograph, recorded on a document S. As illustrated in FIG. 3 and FIG. 5, the reading device 51 includes the case 52, the document table 53, a document table cover 54, the reading unit RM, a reading unit moving mechanism 59, and a placement unit cover 14.

The case 52 has a box shape and the +Z direction side thereof is open. By attaching the document table 53 to the opening of the case 52, a housing of the reading device 51 is formed. As illustrated in FIG. 1, FIG. 3, and FIG. 4, in the case 52, the placement unit cover 14 is rotatably provided, at a position on the +Z direction side of the placement base 41 and the edge guides 46 and 47 of the placement unit 40. As a result of being rotatably provided on the case 52, the placement unit cover 14 can be in a closed position at which the placement unit cover 14 covers the +Z direction side of the placement base 41 and the edge guides 46 and 47, and an open position at which the placement unit cover 14 opens the +Z direction side of the placement base 41 and the edge guides 46 and 47.

Further, as illustrated in FIG. 5 and FIG. 6, a transmission window 56 is disposed at a position facing the detection target portion 46*t* of the edge guide 46, in a side wall on the +Y direction side of the case 52. The transmission window 56 extends in the X-axis direction. The transmission window 56 transmits the emission light DL emitted from the detection sensor 57 of the reading unit RM to be described later, and transmits reflected light RL obtained when the emission light DL is reflected by the detection target portion 46*t*. The transmission window 56 is a transparent or translucent resin plate or glass plate.

The document table 53 is a transparent glass plate. The document S is placed at the document table 53. A placement surface of the document table 53 on which the document S is placed is a surface along the X-Y plane. As a result of being rotatably attached to the case 52, the document table cover 54 can be in a closed position (see FIG. 1, FIG. 3, FIG. 4, and FIG. 6) at which the document table cover 54 covers the +Z direction side of the document table 53, and an open position (not illustrated) allowing the document S to be placed at the document table 53. The color of a cover surface, which is the surface on the −Z direction side of the document table cover 54 covering the +Z direction side of the document table 53, is white.

The reading device 51 reads the image P recorded on the document S, by moving the reading unit RM in the X-axis direction with respect to the document S placed at the document table 53. The X-axis direction is an example of a scanning direction in which the reading unit RM performs scanning. As illustrated in FIG. 3, FIG. 5, FIG. 6, and FIG. 7, the reading unit RM is disposed on the −Z direction side of the document table 53 in the housing of the reading device 51. The reading unit RM includes an image sensor 55, the detection sensor 57, and a holder 58.

The image sensor 55 is held by the holder 58. The image sensor 55 is provided extending in the Y-axis direction along the document table 53. As a result, the image sensor 55 can read the image P recorded on the document S placed at the document table 53, in the Y-axis direction that is the width direction of the document S. The image sensor 55 includes an irradiation unit that irradiates the document S placed at the document table 53 with reading light via the document table 53, and a light-receiving unit that receives the reading light reflected by the document S.

A light source of the light emitted from the irradiation unit of the image sensor 55 is configured by a light emitting diode (LED), for example. The light-receiving unit of the image sensor 55 is constituted by a plurality of photoreceptor elements arranged in the Y-axis direction, for example. A complementary metal oxide semiconductor (CMOS) or a charge coupled device (CCD) can be employed as the photoreceptor element for example.

The detection sensor 57 is disposed at a position facing the detection target portion 46*t* of the edge guide 46, in a side wall on the +Y direction side of the holder 58. The detection sensor 57 includes an emission unit 57*e* and a detector 57*r*. The emission unit 57*e* emits the emission light DL onto the detection target portion 46*t* of the edge guide 46, via the transmission window 56. The detection unit 57*r* detects the reflected light RL, which is the emission light DL reflected by the detection target portion 46*t*, via the transmission window 56. In the embodiment, since the detection sensor 57 and the transmission window 56 are located on the −Z direction side of the case 52 and the document table cover 54, that is vertically below the case 52 and the document cover table 54, the emission light DL is less likely to be visually recognized by the user. Further, since the emission light DL is emitted obliquely downward toward the detection target portion 46*t* or the placement surface 42 positioned further to the −Z direction side than the detection sensor 57, the emission light DL and light obtained as a result of the emission light DL being reflected by the detection target portion 46*t* or the placement surface 42 are less likely to be visually recognized by the user.

The detection sensor 57 detects the detection target portion 46*t* of the edge guide 46 by emitting the emission light DL from the emission unit 57*e* toward the detection target portion 46*t* of the edge guide 46, and by the detection unit 57*r* receiving the reflected light RL obtained as a result of the emission light DL being reflected by the detection target portion 46*t*. The emission light DL is an example of light LG emitted from the reading unit RM toward the detection target portion 46*t* of the edge guide 46. The edge guide 46 is an example of a detection target DT. A reflective photosensor can be employed as the detection sensor 57, for example.

The holder 58 is supported by the case 52 so as to be movable in the X-axis direction. As a result, the reading unit RM of the reading device 51 can emit the reading light from the irradiation unit of the image sensor 55 while moving in the X-axis direction with respect to the document S placed at the document table 53. Then, the recording device 11 reads the image P recorded on the document S, based on the reading light reflected by the document S and received by the light-receiving unit of the image sensor 55.

Further, the reading unit RM of the reading device 51 can detect the detection target portion 46t of the edge guide 46 by emitting the emission light DL from the emission unit 57e of the detection sensor 57 while moving in the X-axis direction. Further, based on a movement distance C of the reading unit RM in the X-axis direction from a home position Rrp (refer to FIG. 7 to FIG. 9) of the reading unit RM to a detection position DP (refer to FIG. 8 and FIG. 9) of the reading unit RM, the recording device 11 calculates a position Tp of the edge guide 46, which changes in accordance with the size of the medium M placed at the placement unit 40. The detection position DP of the reading unit RM is a position of the reading unit RM in the X-axis direction when the reading unit RM detects the detection target portion 46t of the edge guide 46.

In the embodiment, the size of the medium M placed at the placement unit 40 is determined based on a seek distance B, which is a distance in the X-axis direction from a reference position Grp (refer to FIG. 8 and FIG. 9) of the edge guide 46 to the detection position DP of the reading unit RM. The reference position Grp of the edge guide 46 is a position of the reading unit RM in the X-axis direction when the reading unit RM detects the detection target portion 46t in a state in which the edge guides 46 and 47 are regulating the position of the A4-size medium M placed at the placement unit 40. Note that, as illustrated in FIG. 12, the A4-sized medium M placed at the placement unit 40 has a width dimension of 210 mm, which is the dimension in the X-axis direction.

Taking the distance in the X-axis direction from the home position Rrp of the reading unit RM to the reference position Grp of the edge guide 46 to be a distance A, the seek distance B is calculated using the following formula.

Seek distance $B$=movement distance $C$−distance $A$

In the embodiment, in the X-axis direction, the position of the center of the medium M placed at the placement unit 40 is positioned at the center of the placement surface 42 regardless of the dimension of the medium M in the X-axis direction. Therefore, the value of the seek distance B corresponding to the type of the medium M illustrated in FIG. 12 is half a value obtained by subtracting the width dimension of the A4-sized medium M from the width dimension of the medium M. For example, the value of the seek distance B corresponding to the 2L-sized medium M is calculated by the following formula.

(210 mm−127 mm)/2=41.5 mm

Further, the width dimension of the medium M has a variation of approximately ±2 mm. In this case, there is a possibility that the position of the edge guide 46 in contact with the edge of the medium M on the +X direction side is deviated by ±1 mm from a theoretical value, due to the variation in the width dimension of the medium M. For this reason, in a discriminant formula corresponding to the type of the medium M, as illustrated in FIG. 12, for the deviation of the position of the edge guide 46 caused by the variation in the width dimension of the above-described medium M, 2 mm is taken into consideration in a range.

The distance A, which is the distance in the X-axis direction from the home position Rrp of the reading unit RM to the reference position Grp of the edge guide 46, is different for each of the recording devices 11, due to dimensional variations, assembly accuracy, and the like of components constituting the recording device 11. For this reason, in the embodiment, in an assembly process of the recording device 11, the distance A is actually measured in advance, by causing the reading unit RM to detect the detection target portion 46t when the edge guides 46 and 47 are regulating the position of the A4-sized medium M placed at the placement unit 40.

Then, the distance A actually measured for each of the recording devices 11 is written and stored in the memory of the control unit 90 to be described later, together with the calculation formula of the seek distance B and the discriminant formula corresponding to the type of the medium M illustrated in FIG. 12. Since the width of the medium M varies by approximately ±2 mm, in the actual measurement of the distance A, as illustrated in FIG. 8, in place of the A4-sized medium M, it is desirable to use an adjustment jig JG whose dimension in the X-axis direction is adjusted to 210 mm, which is the width dimension of the A4-sized medium M.

The reading unit moving mechanism 59 moves the reading unit RM in the X-axis direction. As illustrated in FIG. 5 and FIG. 7, the reading unit moving mechanism 59 is disposed in the housing of the reading device 51. A rack and pinion mechanism can be employed as the reading unit moving mechanism 59. For example, the reading unit moving mechanism 59 is provided with a rack extending in the X-axis direction on an inner bottom surface, which is an inner surface on the −Z direction side of the case 52. Further, in the reading unit moving mechanism 59, a rotatable pinion gear is provided on the holder 58 of the reading unit RM and meshes with the rack. Further, in the reading unit moving mechanism 59, a drive motor capable of rotating the pinion gear is provided on the holder 58. By driving the drive motor, the reading unit moving mechanism 59 moves the reading unit RM in the X-axis direction.

As illustrated in FIG. 2, the recording device 11 is provided with the control unit 90. The control unit 90 includes a central processing unit (CPU) and a memory (not illustrated). The memory is an example of a storage unit. The CPU can execute various programs stored in the memory, and can execute, for example, various determinations, various commands, and the like.

The memory stores the various programs, such as a program for transporting the medium M, a program for performing the recording on the medium M, a program for reading the image P of the document S, a program for determining the size of the medium M placed at the placement unit 40, a program for displaying the state of the recording device 11 on a display unit of an external device (not illustrated) coupled to the recording device 11, and the like. Further, the memory stores the actual measurement value of the distance A, the calculation formula of the seek distance B, the discriminant formula corresponding to the type of the medium M, and other various tables, various counter values, and the like, which are used to determine the size of the medium M placed at the placement unit 40.

The control unit 90 may be coupled to an external device through a communication interface, a communication cable, a wireless communication line, or the like (not illustrated) provided in the recording device 11. The external device may be provided with a display unit and an external control unit having an external CPU and an external memory in a similar manner to the control unit 90. Examples of the external device include a personal computer, a smartphone, a mobile phone, and a mobile information terminal.

The CPU of the control unit 90 controls the entire recording device 11 by executing the various programs stored in the memory. For example, the control unit 90 transports the medium M placed at the placement unit 40 in the transport direction by controlling the transport mechanism 16. Further, for example, the control unit 90 performs the recording on the medium M transported to the medium support unit 17 by ejecting the ink from the nozzles of the liquid ejecting head 21 moving in the X-axis direction, by controlling the recording unit 20 and the carriage moving mechanism 26.

Further, the control unit 90 displays the state of the recording device 11 on the display unit of the external device, by controlling the external control unit of the external device coupled to the recording device 11. Further, the control unit 90 reads the image P recorded on the document S by controlling the reading device 51. Further, the control unit 90 determines the size of the medium M placed at the placement unit 40 by controlling the reading device 51.

Next, a flow of processing performed by the control unit 90 will be described when determining the size of the medium M placed at the placement unit 40.

First, a case will be described in which, in place of the adjustment jig JG illustrated in FIG. 8, the medium M having the 210 mm dimension in the X-axis direction is placed at the placement unit 40. By controlling the detection sensor 57 and the reading unit moving mechanism 59 of the reading unit RM in the reading device 51, the control unit 90 emits the emission light DL from the emission unit 57e of the detection sensor 57 while moving the reading unit RM in the −X direction from the home position Rrp of the reading unit RM, thus detecting the detection target portion 46t of the edge guide 46.

Then, the control unit 90 calculates the seek distance B, based on the movement distance C from the home position Rrp of the reading unit RM to the detection position DP of the reading unit RM when the reading unit RM detects the detection target portion 46t of the edge guide 46, and on the distance A stored in the memory. When the dimension, in the X-axis direction, of the medium M placed at the placement unit 40 is 210 mm, as illustrated in FIG. 8, since the movement distance C and the distance A are the same, the calculated seek distance B is 0 mm. The control unit 90 determines that the medium M placed at the placement unit 40 is the A4-sized medium M, based on the discriminant formula [−1≤B≤1] satisfied by the calculated seek distance B.

Next, as illustrated in FIG. 9, a case will be described in which the dimension, in the X-axis direction, of the medium M placed at the placement unit 40 is 127 mm. By controlling the detection sensor 57 and the reading unit moving mechanism 59 of the reading unit RM in the reading device 51, the control unit 90 emits the emission light DL from the emission unit 57e of the detection sensor 57 while moving the reading unit RM in the −X direction from the home position Rrp of the reading unit RM, thus detecting the detection target portion 46t of the edge guide 46.

Then, the control unit 90 calculates the seek distance B, based on the movement distance C from the home position Rrp of the reading unit RM to the detection position DP of the reading unit RM when the reading unit RM detects the detection target portion 46t of the edge guide 46, and on the distance A stored in the memory. When the dimension, in the X-axis direction, of the medium M placed at the placement unit 40 is 127 mm, the calculated seek distance B is 41.5 mm. The control unit 90 determines that the medium M placed at the placement unit 40 is the 2L-sized medium M, based on the discriminant formula [40.5≤B≤42.5] satisfied by the calculated seek distance B.

Note that, when the calculated seek distance B does not satisfy any of the discriminant formulas stored in the memory, the control unit 90 may display, on the display unit of the external device coupled to the recording device 11, a message for confirming whether the medium M is correctly placed at the placement unit 40. Note also that, when the type of the medium M placed at the placement unit 40 is input by the user from the operation unit 13 or the external device coupled to the recording device 11 and the calculated seek distance B does not satisfy any of the discriminant formulas stored in the memory, the control unit 90 determines that the medium M of the type input by the user is placed at the placement unit 40.

As described above, according to the recording device 11 according to the first embodiment, the following effects can be obtained.

The recording device 11 is provided with the reading device 51 including the reading unit RM that reads the image P of the document S, with the placement unit 40 on which the medium M is placed, and with the recording unit 20 that performs the recording on the medium M transported from the placement unit 40. By emitting the light LG from the reading unit RM toward the detection target DT for which the position Tp changes in accordance with the size of the medium M placed at the placement unit 40 and calculating the position Tp, the recording device 11 determines the size of the medium M. According to this configuration, since the size of the medium M is determined by the reading device 51 included in the recording device 11, it is not necessary to dispose a plurality of sensors for determining the size of the medium M at the placement unit 40. Therefore, the size of the medium M can be determined with a simple configuration, and an increase in the cost of the recording device 11 can be suppressed.

The recording device 11 is provided with the edge guide 46 that guides the medium M by coming into contact with the edge of the medium M placed at the placement unit 40, and the placement unit 40 is disposed, in the inclined posture, at the rear surface of the main body 12. The reading unit RM reads the image P by moving in the X-axis direction with respect to the document S, and the reading unit RM calculates the position Tp of the edge guide 46, as the detection target DT, by emitting the light LG while moving in the X-axis direction. According to this configuration, the configuration for determining the size of the medium M can be simplified by using the movement of the reading unit RM in the scanning direction.

The recording device 11 calculates the position Tp of the edge guide 46, based on the movement distance C of the reading unit RM in the X-axis direction from the home position Rrp of the reading unit RM to the detection of the edge guide 46. According to this configuration, the position Tp of the edge guide 46 can be calculated by using the movement accuracy of the reading unit RM when the reading device 51 reads the image P of the document S. Thus, it is easy to accurately determine the size of the medium M.

The recording device 11 is provided with the storage unit capable of storing the distance A from the home position Rrp of the reading unit RM to the reference position Grp of the edge guide 46, which is measured in advance for each of the recording devices 11. According to this configuration, by using the value of the distance A stored in the storage unit, it is possible to increase the accuracy of the calculated position Tp of the edge guide 46. Thus, it is easy to accurately determine the size of the medium M.

The reading unit RM includes the detection sensor 57 that is provided in the reading unit RM and emits the light LG toward the detection target DT. According to this configuration, it is possible to determine the size of the medium M with a simple configuration.

2. Second Embodiment

Figure 10:
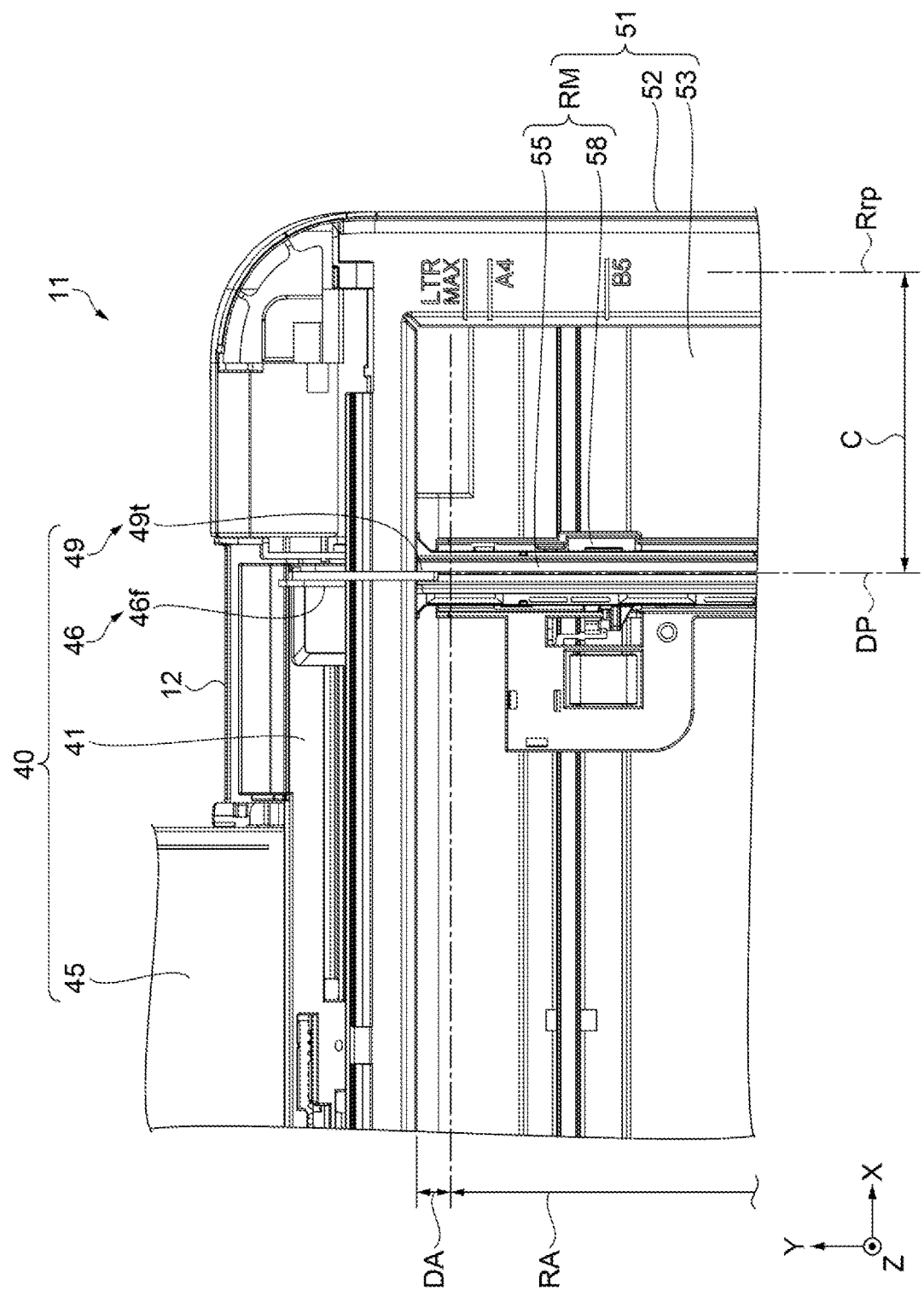
FIG. 10 is a schematic view of main components of the recording device according to a second embodiment.
Figure 11:
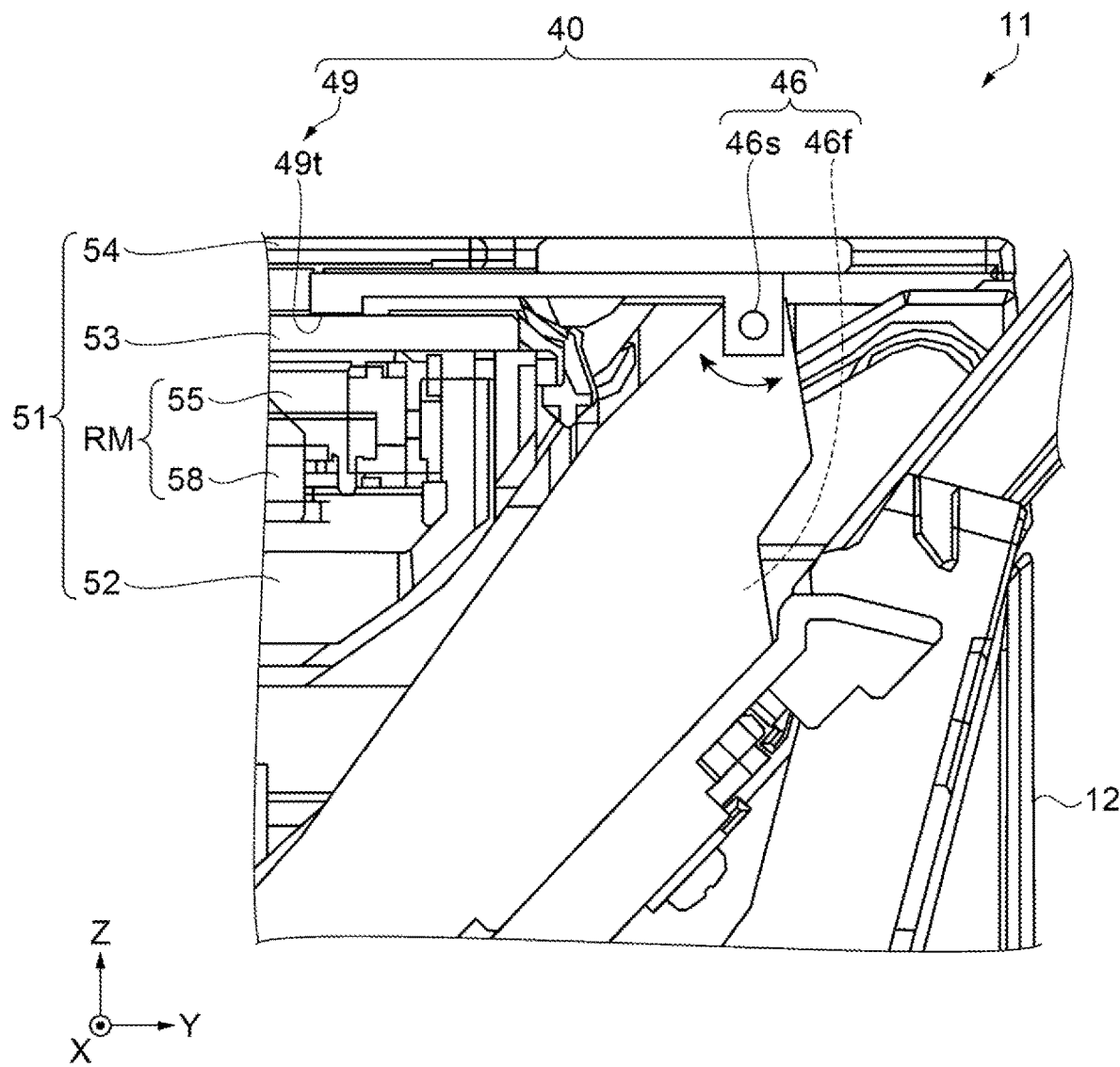
FIG. 11 is a schematic view of main components of the recording device according to the second embodiment.

As illustrated in FIG. 10 and FIG. 11, in the recording device 11 according to a second embodiment, a member 49 extending from the edge guide 46 is provided in place of the detection target portion 46t of the edge guide 46 in the above-described first embodiment, and a detection target portion 49t is disposed at the member 49. Then, in the recording device 11 according to the second embodiment, in place of the emission light DL emitted from the detection sensor 57 of the reading unit RM toward the detection target portion 46t of the edge guide 46 in the first embodiment, reading light is emitted, as the light LG, from the image sensor 55 of the reading unit RM toward the detection target portion 49t of the member 49, as the detection target DT.

In this way, the recording device 11 according to the second embodiment detects the detection target portion 49t of the member 49 and determines the size of the medium M by calculating the position Tp of the edge guide 46 in the same manner as in the above-described first embodiment. For this reason, the recording device 11 according to the second embodiment is not provided with the transmission window 56 in the case 52 of the reading device 51. Further, the recording device 11 according to the second embodiment is not provided with the detection sensor 57 in the reading unit RM of the reading device 51. The remaining configuration of the recording device 11 according to the second embodiment is the same as that of the recording device 11 according to the first embodiment. Note that the same reference signs are used for the same components as those in the first embodiment, and a redundant description thereof will be omitted.

As illustrated in FIG. 11, the edge guide 46 of the embodiment includes a a rotary shaft 46s on the end side in the +Z direction of the edge guide 46. The rotary shaft 46s has a columnar shape protruding from the edge guide 46 in the +X direction. As illustrated in FIG. 10 and FIG. 11, in the placement unit 40 according to the embodiment, the edge guide 46 includes the member 49. The member 49 is a rectangular rod-shaped member extending from the end side in the +Z direction of the edge guide 46.

The member 49 includes the detection target portion 49t on the −Z direction side of the tip of the member 49. The member 49 moves in the X-axis direction together with the edge guide 46, for which the position Tp changes in accordance with the size of the medium M placed at the placement unit 40. The member 49 is disposed on the edge guide 46 so as to be rotatable around the rotary shaft 46s as an axial center along the X-axis direction, as illustrated by arrows in FIG. 11. A color of at least a portion of the member 49 at which the detection target portion 49t is provided is a color having a strong contrast with the color of the cover surface of the document table cover 54, and is black, for example.

On a surface of the document table 53 on the +Z direction side, the reading device 51 according to the embodiment includes a reading area RA in which the document S is placed, and a detection area DA in which the detection target portion 49t of the member 49 is disposed. The reading region RA is disposed on the −Y direction side of the document table 53, which is the front surface side of the recording device 11. The detection area DA is disposed adjacent to the +Y direction side of the reading area RA. The detection area DA extends in the X-axis direction along the +Y direction side edge of the document table 53.

The detection target portion 49t of the member 49 is disposed at a position in contact with the surface of the detection area DA on the +Z direction side. In a state of being positioned between the document table 53 and the document table cover 54 at the closed position, the detection target portion 49t of the member 49 is movable in the X-axis direction together with the edge guide 46 for which the position Tp changes in accordance with the size of the medium M placed at the placement unit 40. Further, since the member 49 is rotatably disposed to be able to rotate around the rotary shaft 46s of the edge guide 46, even when the reading device 51 rotates between the closed position and the open position, the detection target portion 49t can maintain the state of being positioned between the document table 53 and the document table cover 54 at the closed position.

According to the above-described configuration, the reading unit RM according to the embodiment can detect the detection target portion 49t of the member 49 by emitting the reading light, as the light LG, from the irradiation unit of the image sensor 55 while moving in the X-axis direction. The member 49 is an example of the detection target DT. Further, based on the movement distance C of the reading unit RM in the X-axis direction from the home position Rrp of the reading unit RM to the detection position DP (refer to FIG. 10) of the reading unit RM, the recording device 11 calculates the position Tp of the edge guide 46, which changes in accordance with the size of the medium M placed at the placement unit 40.

The detection position DP of the reading unit RM is a position of the reading unit RM in the X-axis direction when the reading unit RM detects the detection target portion 49t of the member 49. Also in the embodiment, in a similar manner to the first embodiment, the control unit 90 of the recording device 11 determines the size of the medium M placed at the placement unit 40 based on the seek distance B, which is the distance in the X-axis direction from the reference position Grp of the edge guide 46 to the detection position DP of the reading unit RM. Note that, in the embodiment, the reference position Grp of the edge guide 46 is a position of the reading unit RM in the X-axis direction when the reading unit RM detects the detection target portion 49t, in a state in which the edge guides 46 and 47 are regulating the position of the A4-sized medium M placed at the placement unit 40.

As described above, according to the recording device 11 according to the second embodiment, the following effects can be obtained.

The reading unit RM includes the image sensor 55 that emits the reading light toward the document S, and the reading unit RM emits the reading light, as the light LG, toward the detection target DT. According to this configuration, by using the reading light emitted from the reading unit RM, it is possible to simplify the configuration for determining the size of the medium M.

The detection target DT is the member 49 extending from the edge guide 46. According to this configuration, it is possible to determine the size of the medium M by emitting the reading light from the reading unit RM toward the member 49 and calculating the position Tp of the edge guide 46.

The member 49 is rotatably provided on the edge guide 46. According to this configuration, for example, even when the reading device 51 rotates between the closed position at which the reading device 51 covers the upper side of the main body 12 and the open position at which the opening at the upper side of the main body 12 is exposed, the relative position of the member 49 with respect to the reading device 51 can be easily maintained.

Although the recording device 11 according to the above-described embodiments of the present disclosure is basically assumed to have the configuration as described above, it goes without saying that modification, omission, and the like of part of the configuration is possible within a range that does not deviate from the scope and gist of the present disclosure. Further, the above embodiment and other embodiments to be described below can be combined with each other within a technically consistent range. Other embodiments will be described below.

In the above-described embodiments, the recording device 11 may determine the size of the medium M by emitting the light LG from the reading unit RM toward the edge, in the X-axis direction, of the medium M for which the position changes in accordance with the size of the medium M placed at the placement unit 40, and calculating the position of the edge in the X-axis direction of the medium M. In this case, the edge of the medium M in the X-axis direction is an example of the detection target DT. Further, in this case, the reading device 51 according to the second embodiment may be provided with a light guide member that guides the reading light emitted from the irradiation unit of the image sensor 55 in the reading unit RM toward the edge of the medium M in the X-axis direction.

In the above-described embodiments, the edge guide 46 may be positioned on the −X direction side of the medium M placed at the placement unit 40, and the edge guide 47 may be positioned on the +X direction side of the medium M placed at the placement unit 40. In this case, the edge guide surface 46f of the edge guide 46 comes into contact with the edge of the medium M in the −X direction, and the edge guide surface 47f of the edge guide 47 comes into contact with the edge of the medium M in the +X direction. Further, in this case, the detection target portion 46t provided on the edge guide 46 is located on the −X direction side of the edge guide 47.

In the above-described first embodiment, the reading device 51 need not necessarily be provided with the transmission window 56 in the case 52. In this case, a slit, through which pass the emission light DL emitted from the detection sensor 57 of the reading unit RM and the reflected light RL obtained as a result of the emission light DL being reflected by the detection target portion 46t, may be provided at a position facing the detection target portion 46t of the edge guide 46 in the side wall on the +Y direction side of the case 52.

In the above-described embodiments, the recording device 11 may determine the size of the medium M by emitting the reading light as the light LG from the irradiation unit of the image sensor 55 in the reading unit RM toward the detection target portion 46t of the edge guide 46 and calculating the position Tp of the edge guide 46. In this case, the reading device 51 may be provided with the light guide member that guides the reading light emitted from the irradiation unit of the image sensor 55 toward the detection target portion 46t of the edge guide 46.

In the above-described second embodiment, the member 49 need not necessarily be rotatably provided on the edge guide 46. In this case, in the member 49, a flexible portion may be provided at a position between a base end portion fixed to the edge guide 46 and the tip end portion on which the detection target portion 49t is provided. In this way, even when the reading device 51 rotates between the closed position and the open position, the detection target portion 49t may be maintained to be positioned between the document table 53 and the document table cover 54 positioned at the closed position.

In the above-described embodiments, in addition to determining the size of the medium M, the recording device 11 may detect a state of other members disposed near the placement unit 40 by emitting the light LG from the reading unit RM of the reading apparatus 51. For example, the recording device 11 may detect whether the placement unit cover 14 is at the closed position or at the open position by emitting the light LG from the reading unit RM. Further, for example, the recording device 11 may detect whether the support plate 45 is at the support position or the stored position by emitting the light LG from the reading unit RM.

In the above-described embodiments, the recording device 11 may be provided with a display unit. For example, in the recording device 11, a display unit may be provided in the operation unit 13. In this case, the control unit 90 may notify the user by displaying the state of the recording device 11 on the display unit of the recording device 11.

In the above-described embodiments, the reference position Grp of the edge guide 46 may be a position, in the X-axis direction, of the detection target portion 46t or of the reading unit RM when the reading unit RM detects the detection target portion 46t in a state in which the edge guides 46 and 47 are regulating the position of the medium M of a size other than the A4 size placed at the placement unit 40. For example, the medium M of the size other than the A4 size may be the letter-sized medium M, the 21-sized medium M, or the business card-sized medium M.

In the above-described embodiments, the distance A from the home position Rrp of the reading unit RM to the reference position Grp of the edge guide 46 need not be actually measured in advance. In this case, a theoretical value of the distance A may be written and stored in the memory of the control unit 90.

In the above-described embodiments, the distance A from the home position Rrp of the reading unit RM to the reference position Grp of the edge guide 46 need not be actually measured in advance. In this case, the recording device 11 may determine the size of the medium M placed at the placement unit 40 based on the movement distance C of the reading unit RM in the X-axis direction from the home position Rrp of the reading unit RM to the detection position DP of the reading unit RM. Further, in this case, a discriminant formula that is set based on the movement distance C corresponding to the type of the medium M may be written and stored in the memory of the control unit 90. Then, the control unit 90 may determine the size of the medium M placed at the placement unit 40 based on the movement distance C from the home position Rrp of the reading unit RM to the detection position DP of the reading unit RM when the reading unit RM detects the detection target portion 46t or the detection target portion 49t, and on the discriminant formula stored in the memory.

What is claimed is:

1. A recording device, comprising:
    a reading device including a reader configured to read an image of a document;
    a placement member at which a medium is placed;
    a recorder configured to perform recording on the medium transported from the placement member; and
    an edge guide configured to guide the medium by coming into contact with an edge of the medium placed at the placement member, wherein a size of the medium is determined by emitting light from the reader toward a detection target and calculating a position thereof, the position of the detection target changing in accordance with the size of the medium placed at the placement member, the reader reads the image by moving in a first moving direction with respect to the document, and a position of the edge guide, as the detection target, is determined by the reader emitting the light while moving in the first moving direction.

2. The recording device according to claim 1, wherein the placement member is disposed in an inclined posture at a rear surface of a device main body.

3. The recording device according to claim 1, wherein the position of the edge guide is determined based on a movement distance of the reader in the first moving direction from a home position of the reader to where the edge guide is detected.

4. The recording device according to claim 3, comprising: a memory configured to store a distance from the home position of the reader to a reference position of the edge guide, the distance being measured in advance for each recording device.

5. The recording device according to claim 1, comprising: a detection sensor provided at the reader and configured to emit the light toward the detection target.

6. The recording device according to claim 1, wherein the reader includes an image sensor configured to emit reading light toward the document, and the reader emits the reading light as the light toward the detection target.

7. The recording device according to claim 6, wherein the detection target is a member extending from the edge guide.

8. The recording device according to claim 7, wherein the member is rotatably provided at the edge guide.

9. The recording device according to claim 1, wherein the reader includes an emitter and a detector, the emitter emits the light, and the detector detects a reflected light, which is the light reflected by the detection target.

10. A recording device, comprising:

a reading device including a reader configured to read an image of a document;

a placement member at which a medium is placed;

a recorder configured to perform recording on the medium transported from the placement member; and an edge guide configured to guide the medium by coming into contact with an edge of the medium placed at the placement member, wherein a size of the medium is determined by emitting light from the reader toward a detection target and calculating a position thereof, the position of the detection target changing in accordance with the size of the medium placed at the placement member, the placement member is disposed in an inclined posture at a rear surface of a device main body, the reader reads the image by moving in a first moving direction with respect to the document, a position of the edge guide, as the detection target, is determined by the reader emitting the light while moving in the first moving direction, the detection target is a member extending from the edge guide, and the member is rotatably provided at the edge guide.

\* \* \* \* \*